(12) United States Patent
Schaap et al.

(10) Patent No.: US 11,396,395 B2
(45) Date of Patent: Jul. 26, 2022

(54) AUTOMATED BAG LOADING SYSTEM

(71) Applicant: Viking Masek Global Packaging Technologies, Oostburg, WI (US)

(72) Inventors: Michael Schaap, Oostburg, WI (US); Seth Weedman, Oostburg, WI (US); Jamie Vertz, Oostburg, WI (US)

(73) Assignee: Viking Masek Global Packaging, Oostburg, WI (US)

( * ) Notice: Subject to any disclaimer, the term of this patent is extended or adjusted under 35 U.S.C. 154(b) by 0 days.

(21) Appl. No.: 17/062,936

(22) Filed: Oct. 5, 2020

(65) Prior Publication Data

US 2021/0101705 A1 Apr. 8, 2021

Related U.S. Application Data

(60) Provisional application No. 62/910,831, filed on Oct. 4, 2019.

(51) Int. Cl.
*B65B 43/16* (2006.01)
*B65G 47/244* (2006.01)
*B65G 47/86* (2006.01)
*B65B 57/02* (2006.01)

(52) U.S. Cl.
CPC ............. *B65B 43/16* (2013.01); *B65B 57/02* (2013.01); *B65G 47/244* (2013.01); *B65G 47/847* (2013.01); *B65G 2203/0233* (2013.01)

(58) Field of Classification Search
CPC ....... B65B 43/16; B65B 57/02; B65G 47/244; B65G 47/847; B65G 2203/0233
USPC .................................................. 198/377.07
See application file for complete search history.

(56) References Cited

U.S. PATENT DOCUMENTS

| | | | |
|---|---|---|---|
| 4,241,562 A | 12/1980 | Meyer | |
| 4,284,301 A | 8/1981 | Geiger et al. | |
| 4,588,070 A | 5/1986 | Smith | |
| 5,201,166 A | 4/1993 | Johnsen | |
| 6,651,407 B2 | 11/2003 | Hiramoto et al. | |
| 6,672,038 B2 | 1/2004 | McGrane et al. | |
| 9,139,314 B2 | 9/2015 | Ishikawa et al. | |
| 2005/0067754 A1* | 3/2005 | Shigenaga | B65H 1/22 271/30.1 |
| 2014/0083061 A1* | 3/2014 | Ibaraki | B65B 3/02 53/558 |
| 2015/0251790 A1* | 9/2015 | Nakamoto | B65H 3/54 414/796.5 |
| 2017/0088362 A1* | 3/2017 | Yoshikane | B31B 70/022 |

FOREIGN PATENT DOCUMENTS

| | | | | |
|---|---|---|---|---|
| CA | 2688962 A1 | * | 12/2010 | ............. B31B 70/00 |
| EP | 2915661 A1 | * | 9/2015 | ............. B31B 50/00 |
| KR | 20170085958 A | * | 7/2017 | ............... G01V 8/20 |

* cited by examiner

*Primary Examiner* — Gene O Crawford
*Assistant Examiner* — Lester Rushin, III
(74) *Attorney, Agent, or Firm* — Boyle Fredrickson, S.C.

(57) ABSTRACT

An automatic bag loading system includes a transfer arm configured to grab a bag and transfer the bag from a conveyor a bag gripper, which then rotates the bag to a filling station. The system further includes a detection device to detect a location of a leading edge of the bag between the conveyor and the bag gripper.

19 Claims, 12 Drawing Sheets

AUTOMATED BAG LOADING SYSTEM

CROSS-REFERENCE TO RELATED APPLICATION

This application claims the benefit of U.S. Provisional Patent Application No. 62/910,831, filed Oct. 4, 2020, which is incorporated by reference herein in its entirety.

BACKGROUND OF THE INVENTION

1. Field of the Invention

The present invention is related to an automated bag loading system and, more particularly, to an automated bag loading system including a detection system to determine the location of the bag as it is moved from a conveyor belt to a transfer arm.

2. Discussion of Related Art

On a typical pre-made bag rotary machine, the bags are shingled on a single infeed conveyor to provide a means for individual bags to be loaded into rotary bag grippers. These systems have a number of inaccuracies that reduce overall efficiency of the machine. For instance, these systems are accurate in bag placement, do not always pick a bag, and require semi-accurate shingling of bags by operators. Due to these inaccuracies, these systems produce scrap bags that waste product and bags and reduce the overall efficiency of the bag loading system.

As such, there is a need in the art for an automated bag loading system that improves the accuracy of grabbing and accurately placing bags throughout the system to ensure accurate and efficient loading of bags.

SUMMARY OF THE INVENTION

The present invention is related to an automated bag loading system and, more particularly, to an automated bag loading system including a detection system to determine the location of the bag as it is moved from a conveyor belt to a bag gripper.

According to an aspect of the invention, an automatic bag loading system includes a transfer arrangement configured to grab a bag and transfer the bag from a first point to a second point and a bag gripper configured to receive the bag from the transfer arrangement at the second point and rotate the bag to a filling station. The system further includes a detection device to detect a location of the bag between the first point and second point.

In accordance with another aspect of the invention, the automatic bag loading system detects the location of the bag at one or more positions between the first point and the second point. Further yet, the detection device detects the leading edge of the bag to detect the location of the bag between the first point and the second point.

In accordance with yet another aspect of the invention, the automatic bag loading system includes a controller to receive the location of the leading edge of the bag between the first point and the second point. In addition, the controller determines how much further the transfer arrangement and the bag need to travel to reach the second point. The transfer arrangement may include a transfer arm with a pivotable picking head that is able to transition the bag from horizontal position to a vertical position.

In accordance with another aspect of the invention, the automatic bag loading system includes a bag gripper detection device configured to detect the bag in a set of grippers of the rotary bag gripper. The bag gripper detection device measures a leading point of a top edge of the bag and a trailing point of the top edge of the bag. In turn, the bag gripper detection device transmits the measurement of the leading point and trailing point of the top edge of the bag to a controller. The controller is then able to determine if the bag is properly placed within the set of grippers of the rotary bag gripper.

According to another aspect of the invention, a bag loading system includes a transfer arm configured to grab a bag and transfer the bag from a conveyor to a bag gripper. The transfer arm includes a picking head which is pivotable between a first position and a second position. The bag gripper is configured to receive the bag from the transfer arm and rotate the bag to a filling station.

In accordance with an aspect of the invention, the bag loading system includes a detection device to detect a location of the bag as the transfer arm travels between the conveyor and the bag gripper. It is further contemplated that the detection device tracks a leading edge of the bag.

In accordance with another aspect of the invention, the bag is oriented horizontally when the picking head is in the first position, while the bag is oriented vertically when the picking head is in the second position. The picking head of the transfer arm may include an upper plate pivotably coupled to a lower plate. The lower plate is oriented parallel to the upper plate when the picking head is in the first position. Conversely, the lower plate is oriented perpendicular to the upper plate when the picking head is in the second position. Meanwhile, the transfer arm also includes an actuation device with a first end coupled to the upper plate and a second end coupled to the lower plate. The actuation device is configured to transition between a contracted position and an extended position to transfer the picking head between the first position and the second position.

In accordance with yet another aspect of the invention, the upper plate includes at least one mounting plate extending from a lower surface thereof and the lower plate includes at least one mounting plate extending from an upper surface thereof. Each pivot plate includes an opening formed in a distal end thereof. A rod extends through the openings of the pivot plates of the upper and lower plates to form a pivot axis upon which the lower plate pivots with respect to the upper plate.

In accordance with another aspect of the invention, the picking head of the transfer arm also includes at least one grabbing element extending downward from the lower plate. Each grabbing element includes a rod and a cup disposed at a distal end thereof. The cup is configured to grab the bag. Additionally, the lower plate includes at least one slot formed therethrough. The rod of each grabbing element extends through the slot and has a cup disposed at a distal end of the rod. Further, each rod may be moved laterally or longitudinally within the slot to adjust the location of the grabbing element.

According to yet another aspect of the invention, a bag loading system includes a transfer arm including a picking head configured to grab a bag and transfer the bag from a conveyor to a bag gripper and a detection device configured to detect a location of the bag between the conveyor and the bag gripper. The picking head pivots the bag between a horizontal orientation and a vertical orientation. Further, the bag gripper is configured to receive the bag from the picking head of the transfer arm and rotate the bag to a filling station.

In accordance with another aspect of the invention, the picking head grabs the bag from the conveyor in the horizontal orientation. Conversely, the bag gripper receives the bag from the picking head in the vertical orientation.

In accordance with yet another aspect of the invention, the detection device detects the location of the bag at one or more positions between the conveyor and the bag gripper. Further yet, the system includes a controller configured to receive the location of the leading edge of the bag being carried by the picking head between the conveyor and the bag gripper. In addition, the controller determines how much further the bag needs to travel to reach the bag gripper.

In accordance with another aspect of the invention, the picking head includes a first plate pivotably coupled to a second plate about a pivot axis. The picking head also includes an actuator configured to extend and contract to pivot the first and second plates about the pivot axis.

DESCRIPTION OF THE DRAWINGS

The drawings illustrate preferred embodiments presently contemplated for carrying out the invention.

In the drawings.

DETAILED DESCRIPTION OF THE PREFERRED EMBODIMENTS

The present invention and the various features and advantageous details thereof are explained more fully with reference to the non-limiting embodiment described in detail in the following description.

Figure 1:
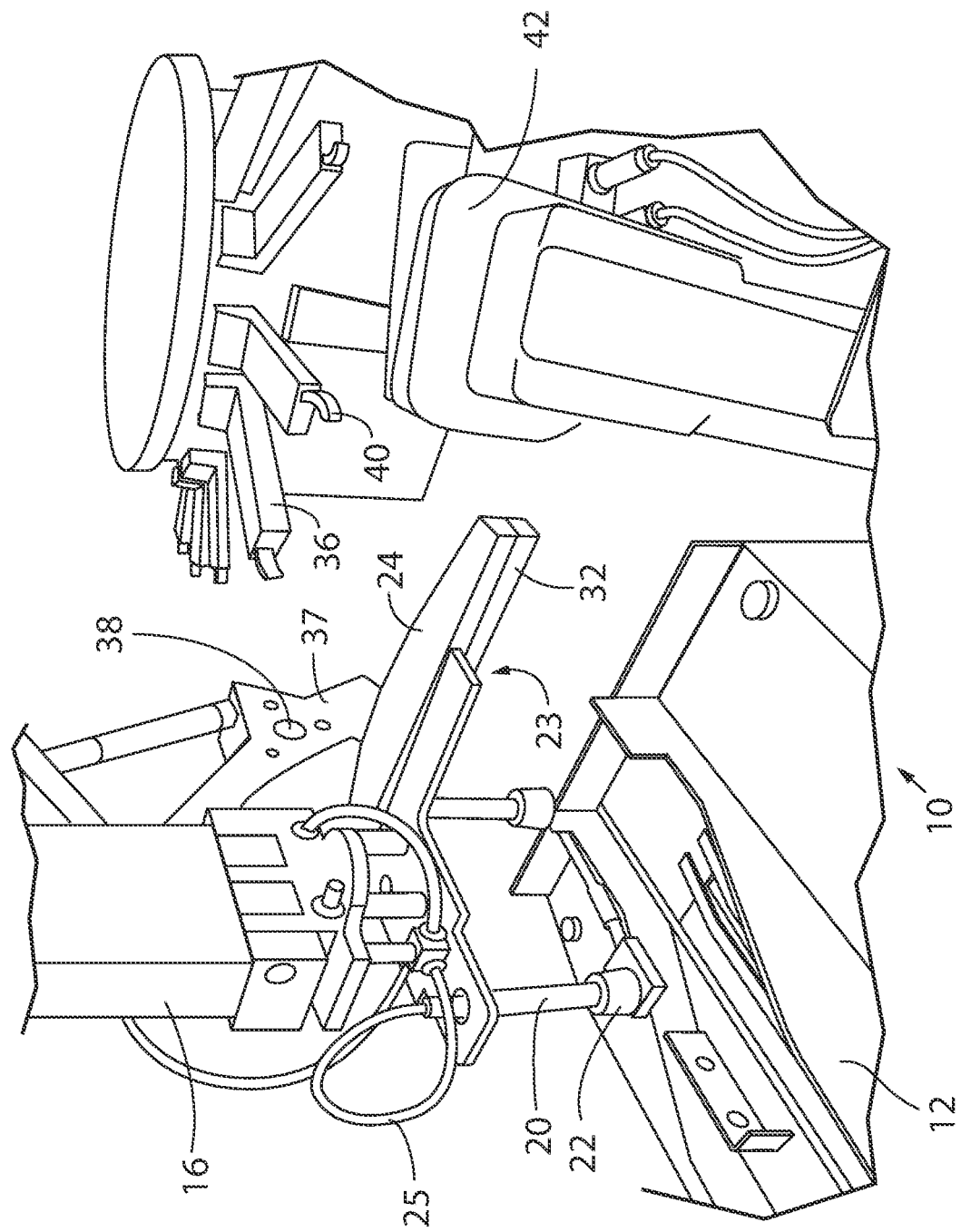
FIG. 1 is a perspective view of an automated bag loading system, according to an embodiment of the invention.
Figure 2:
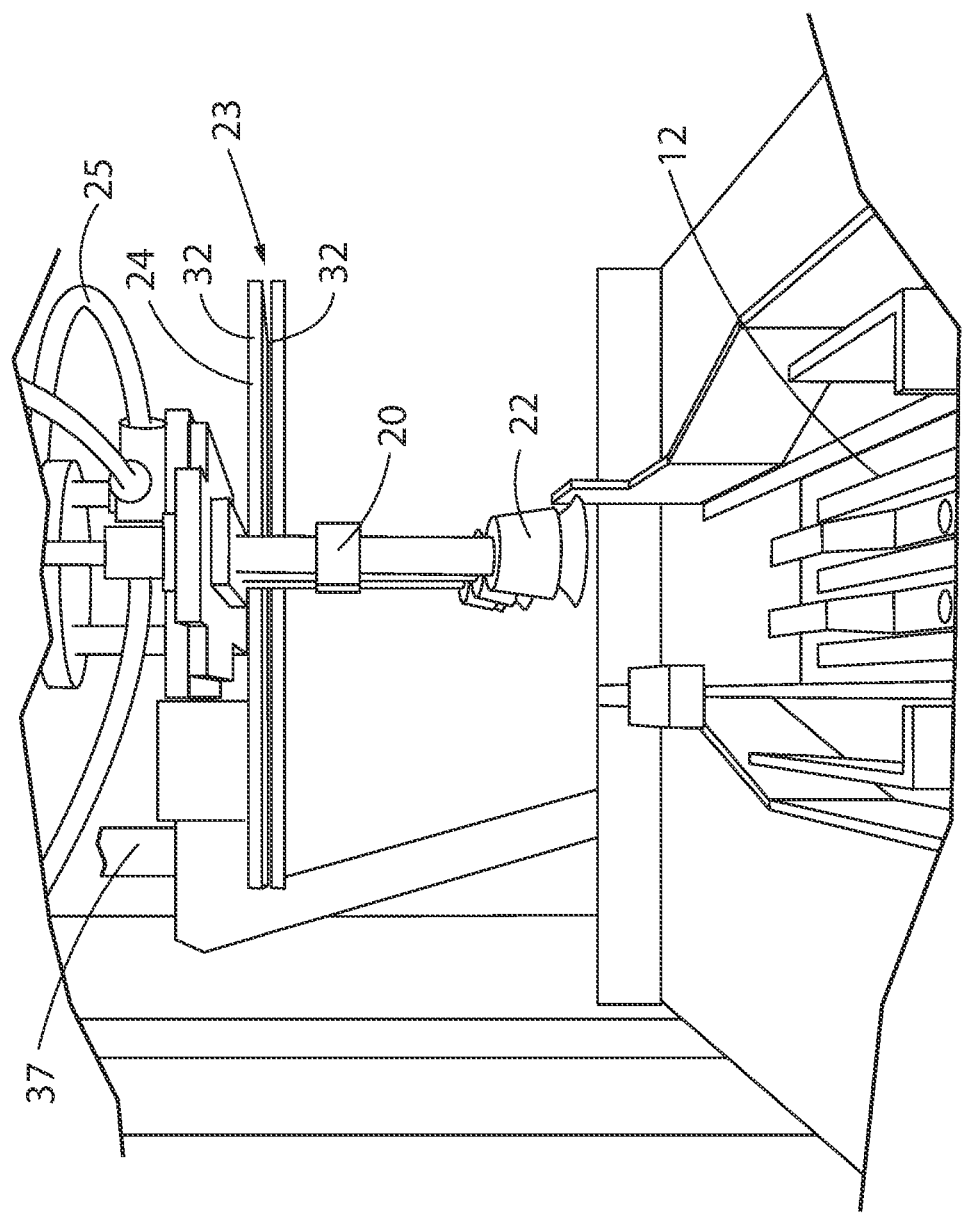
FIG. 2 is an elevation view of the automated bag loading system of FIG. 1 showing its conveyor transfer arm and bag clamp transfer arm.
Figure 3:
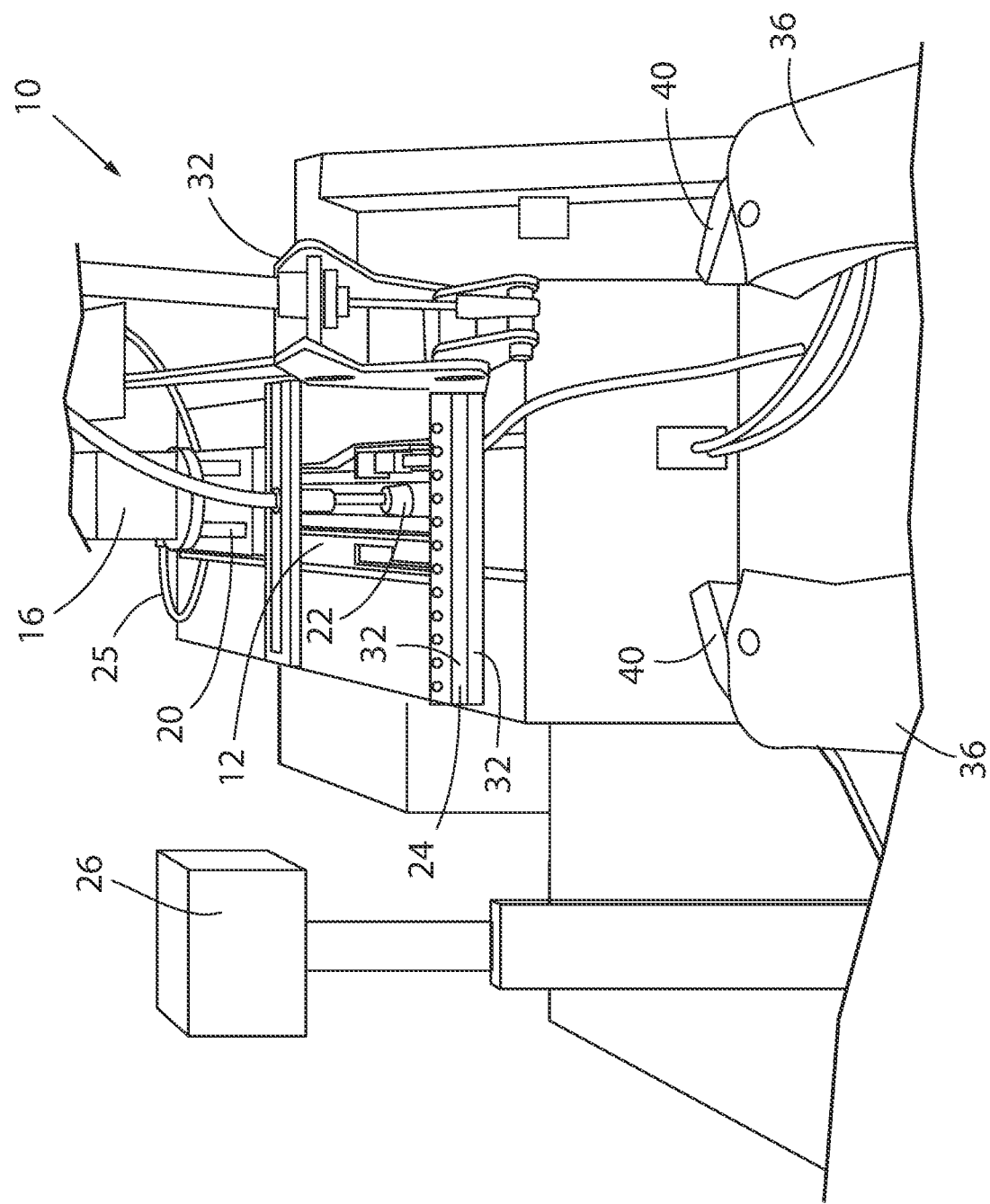
FIG. 3 is a raised perspective view of the automated bag loading system of FIG. 1 showing its conveyor transfer arm, bag clamp transfer arm, and rotary bag gripper.

Referring to FIGS. 1-3, an automated bag loading system 10 is shown according to a non-limiting embodiment of the invention. The automated bag loading system 10 includes a conveyor 12 configured to feed bags to be filled. An operator stacks or shingles a number of the bags onto the conveyor 12, which may be a servo-controlled accumulation conveyor having a belt. The belt of the conveyor 12 may be either flat or flighted depending on the bag type.

In instances of the invention using a conveyor 12 having a flighted belt, each flight of the belt is a contained area that is equally repeated a specific number of times around the length of the belt. Each contained area is configured to receive a number of bags that can be stacked within each flight. A typical number of bags stacked within each flight is 20-40 bags, but the number of bags stacked within each flight may be dependent on the bag type. In the representative embodiment of the invention, the belt of the conveyor 12 may include 10-20 flights depending on the length of the belt. In other embodiments of the invention, the belt of the conveyor 12 may include any number of flights along the length of the belt. The conveyor 12 and its belt are indexed one flight at a time when the leading flight has had all of its bags removed. In the representative embodiment of the automated bag loading system 10, a conveyor detection system 16 may include sensors to determine when the flight has been emptied of bags. In instances of the invention having a conveyor 12 using a flat belt, the bags may be shingled on top of one another and continually fed through the system 10 by the conveyor 12. The conveyor 12 and its belt are indexed one bag at a time into a fixed position when needed.

The bag loading system 10 also includes a transfer arrangement 23 including a conveyor transfer arm 16 and a bag clamp transfer arm 24. The conveyor transfer arm 16 is also referred to as a pick and place unit (P&P). The P&P 16 includes a number of servo motors and a picking head 20. In the representative embodiment of the invention, the picking head 20 includes a number of flexible vacuum cups 22 configured to grab and hold the bag as the P&P 16 transfers the bag from a first point at the conveyor 12 to a second point at a bag clamp transfer arm 24. The flexible vacuum cups 22 are coupled to an air system 25 that creates a vacuum in order for the cups 22 to grab a bag from the conveyor 12. The P&P 16 is configured to grab a single bag at the first point and move it vertically and/or horizontally toward the bag clamp transfer arm 24 and to an intermediate point, where the P&P 16 transfers the bag to the bag clamp transfer arm 24. The amount of vertical and horizontal movement of the P&P 16 is dependent on the respective locations of the first point at the conveyor 12 and the intermediate point at the bag clamp transfer arm 24.

Once the P&P 16 arrives at the intermediate point and transfers the bag to the bag clamp transfer arm 24, the P&P 16 returns to the first point at the conveyor 12. If the conveyor 12 still contains bags, the P&P 16 grabs the next bag and transfers it from the first point at the conveyor to the bag clamp transfer arm 24 at the intermediate point. If the conveyor 12 is empty and contains no bags, the P&P 16 remains in a holding position at or adjacent the first point until bags are indexed on the conveyor 12.

As stated above, once the P&P 16 has grabbed a bag from the conveyor 12 at the first point, the P&P 16 moves with the bag in a vertical and/or horizontal direction towards the bag clamp transfer arm 24 and to the intermediate point. During movement from the first point to the intermediate point, a detection device 26 senses the location of the bag in a number of places. In the representative embodiment of the invention, the detection device 26 is located so as to detect a leading edge 28 of the bag as the bag is transferred by the P&P 16 from the first point to the second point.

The detection device 26 is configured to communicate with a controller 30, which determines the location of the bag between the first point and the intermediate point based on location information received from the detection device 26. The detection device 26 may also be configured to determine the location of the bag between the first point and a second point defined below. In turn, the controller 30 is able to determine the location of the bag with respect to the bag transfer clamp arm 24. The controller 30 then determines how much further the P&P 16 needs to carry the bag to accurately place the leading edge 28 of the bag in the bag clamp transfer arm 24. As such, any variations of the leading edge 28 of the bag due to placement of the bag on the conveyor 12, grabbing of the bag by the P&P 16, or bag type and size may be compensated for in order to ensure accurate placement of the bag by the P&P 16. Since the travel distance of the P&P 16 is determined by the detection device 26 and the controller 30 determining the relative distance between the leading edge 28 of the bag and the bag transfer clamp arm 24, the bag may be accurately transferred by the P&P 16 to the bag transfer clamp arm 24 each time without overshooting or undershooting the bag transfer clamp arm 24.

Once the P&P 16 and bag are in the intermediate position, the bag clamp transfer arm 24 clamps down on the bag at the leading edge 28 or adjacent the leading edge 28 of the bag. In the representative embodiment of the invention, the bag clamp transfer arm 24 includes a set of jaws 32 that are in an open position when the bag is placed in the bag clamp transfer arm 24 and then transfer to a closed position to secure the bag in the bag clamp transfer arm 24. Further yet, it is contemplated that while transitioning between the open and closed positions, one of the set of jaws 32 may move while the other of the set of jaws 32 stay stationary or both of the set of jaws 32 may move.

Once in the closed position, the clamp transfer arm 24 transfers the bag from the intermediate point to a second point located at or adjacent to a rotary bag gripper 36. When transferring the bag from the intermediate point to the second point, the clamp transfer arm 24 is configured to lift the bag and orient the bag to be received by the rotary bag gripper 36. In the representative embodiment of the invention, the clamp transfer arm 24 is configured to change the orientation of the bag from a horizontal orientation at the intermediate point to a vertical orientation at the second point. As shown in FIG. 2, the jaws 32 of the clamp transfer arm 24 are coupled to an arm 37 and spaced apart from a rotational axis 38. In turn, the arm 37 is able to rotate the clamp transfer arm 24 about the rotational axis 38 so that the jaws 32 transition the bag from the horizontal orientation to the vertical orientation and raise the bag as the clamp transfer arm 24 transfers the bag from the P&P 16 at the intermediate point to the rotary bag gripper 36 at the second point.

The grippers 40 of the rotary bag gripper 36 are initially in an open position until the clamp transfer arm 24 places the bag in the third point. In response to the bag being disposed in the second point, the grippers 40 of the rotary bag gripper 36 at the third point transition from the open position to a closed position in order to hold the bag. Once the grippers 40 are in the closed position and the bag is secured within the grippers 40 of the rotary bag gripper 36, the jaws 32 of the clamp transfer arm 24 transition to the open position, and the clamp transfer arm 24 rotates bag to the intermediate point in preparation for receiving the next bag.

The rotary bag gripper 36 includes a number of sets of grippers 40, each set of grippers 40 configured to grab a bag. In turn, the rotary bag gripper 36 is able to rotate multiple bags through different stages of filling and sealing operations. As the rotary bag gripper 36 rotates with the bag from the third point, a bag gripper detection device 42 measures the leading and trailing points of the top edge 28 of the bag. The controller 30 is configured to receive the above information from the bag gripper detection device 42. In turn, the controller 30 is able to determine if the bag is properly placed within the set of grippers 40. If the controller 30 determines that the bag is not properly placed within the set of grippers 40, that bag is not filled or sealed and may be rejected for use again.

Figure 11:
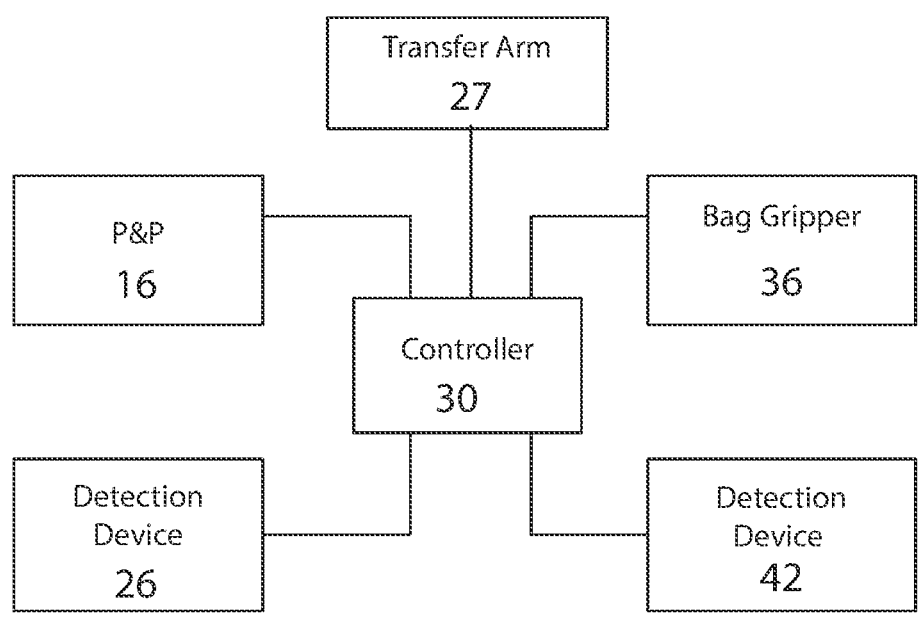
FIGS. 11 and 12 are schematic of a controller of the automated bag loading systems of the invention.

FIG. 11 illustrates a schematic of the controller 30 in communication with the detection devices 26, 42. As shown, the controller 30 is communication with the detection devices 26, 42, the P&P 16, bag transfer arm 24, and bag gripper 36. As such, the controller 30 is able to controller operation of these elements based on the location of the bag as detected by the detection devices, as described above.

Figure 4:
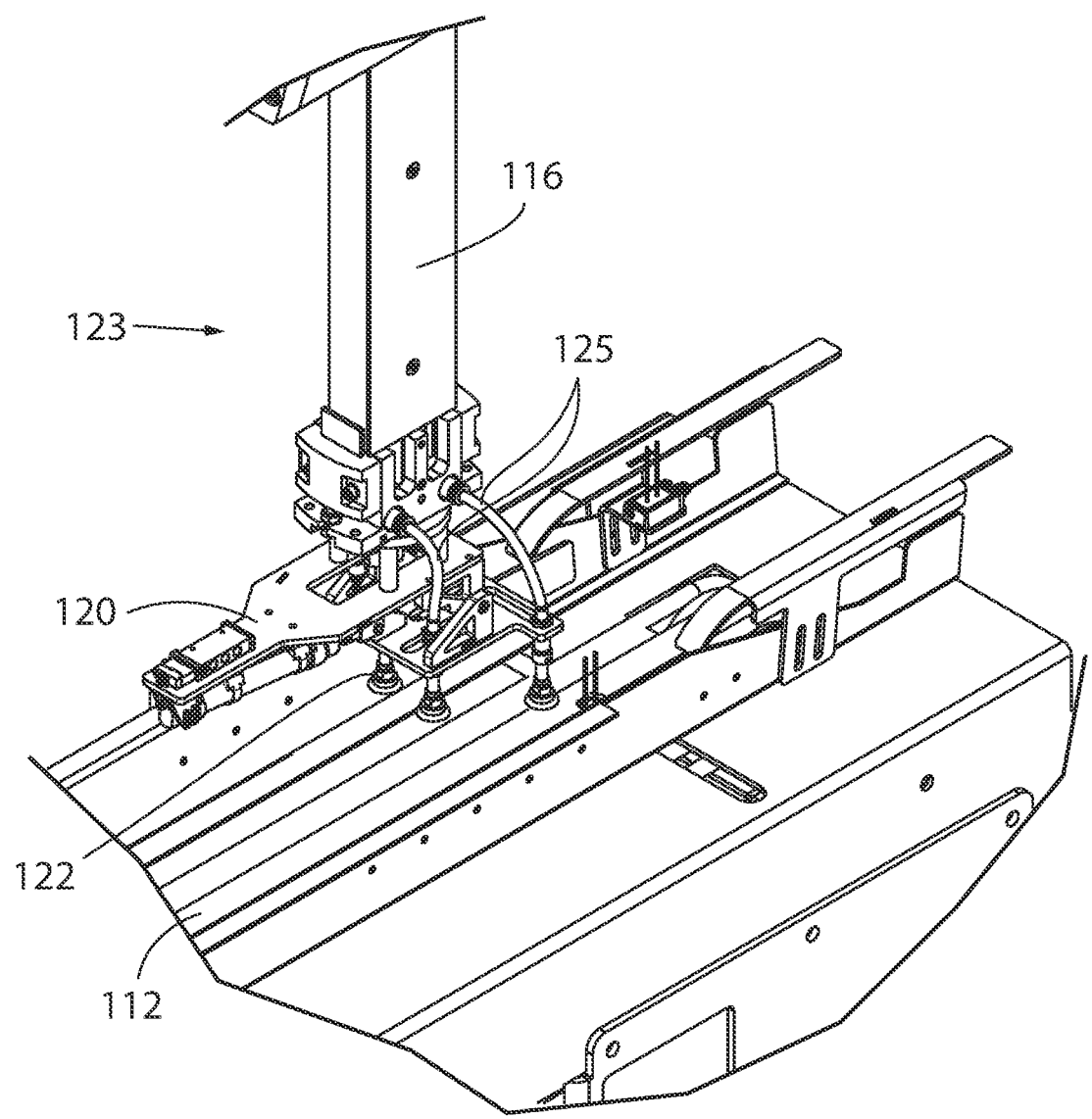
FIG. 4 is a perspective view of an automated bag loading system, according to another embodiment of the invention.

Now referring to FIG. 4, another contemplated embodiment of the bag loading system 110 is shown. Similar, to the previously described automated bag loading system 10, the automated bag loading system 110 includes a conveyor 112 configured to feed bags to be filled, the conveyor 112 may include a belt that is either flat or flighted depending on the bag type. A number of bags are stacked or shingled onto the belt of the conveyor 112.

The bag loading system 110 also includes an alternative transfer arrangement 123 than that of the previously discussed bag loading system 10. The transfer arrangement 123 includes a transfer arm 116 having a number of servo motors and a picking head 120 that allows movement and transfer of a bag from the conveyor 112. As shown in FIGS. 5-10, the picking head 120 includes a number of grabbing elements 122 configured to grab and hold the bag as the transfer arm 116 moves the bag from a first point at the conveyor 112 (FIG. 5) to a second point at or adjacent to a rotary bag gripper 136 (FIG. 6). Further details of the picking head 120 will be described below.

The transfer arm 116 is configured to grab a single bag at the first point and move it vertically and/or horizontally toward the rotary bag gripper 136 and to the second point. The amount of movement of the transfer arm 116 is dependent on the respective locations of the first point at the conveyor 112 and the second point at or adjacent to a rotary bag gripper 136. Further yet, the system 110 includes a detection device 126 that determines the location of the bag held by the picking head 120 as it is transferred from the first point to the second point. During movement from the first point to the second point, the detection device 126 senses the location of the bag in a number of places. In the representative embodiment of the invention, the detection device 126 is located so as to detect a leading edge 137 of the bag 135 as the bag 135 is transferred by the transfer arm 116 from the first point to the second point. As will be described in further detail below, the picking head 120 of the transfer arm 116 is configured to pivot so as to transition the bag grabbed from the conveyor 112 from a horizontal position or generally horizontal position to a vertical position or generally vertical position.

The detection device 126 is configured to communicate with a controller 130, which determines the location of the bag between the first point and the second point based on location information received from the detection device 126. In turn, the controller 130 is able to determine the location of the bag with respect to the bag gripper 136 and determine how much further the picking head 116 needs to be moved in the horizontal and vertical directions to carry the bag to the bag gripper 136. As a result, any variations in the location of the leading edge 137 of the bag 135 due to placement of the bag on the conveyor 112, grabbing of the bag by the picking head 116, or bag type and size may be compensated for in order to ensure accurate placement of the bag by the picking head 116. Since the travel distance of the picking head 116 is determined by the detection device 126 and the controller 130 determining the relative distance between the leading edge 137 of the bag 135 and the bag gripper 136, the bag may be accurately transferred by the picking head 116 to the bag gripper 136 each time without overshooting or undershooting the bag gripper 136.

Similar to rotary bag griper 36, rotary bag gripper 136 includes grippers 140 that are initially in an open position until the picking head 120 and the transfer arm 116 place the bag at the second point. In response to the bag being disposed at the second point, the grippers 140 of the rotary bag gripper 136 transition from the open position to a closed position in order to hold the bag. Once the grippers 140 are in the closed position and the bag is secured within the grippers 140 of the rotary bag gripper 136, the air system 125 and vacuum cups 122 release the bag and the picking head 120 and the transfer arm 116 returns to the first point at the conveyor 112.

The rotary bag gripper 136 includes a number of sets of grippers 140, each set of grippers 140 configured to grab a bag 135. In turn, the rotary bag gripper 136 is able to rotate multiple bags through different stages of filling and sealing operations. As the rotary bag gripper 136 rotates with the bag from the second point, a bag gripper detection device 142 measures the leading and trailing points of the top edge 28 of the bag. The controller 130 is configured to receive the above information from the bag gripper detection device 142. In turn, the controller 130 is able to determine if the bag is properly placed within the set of grippers 140. If the controller 130 determines that the bag is not properly placed within the set of grippers 140, that bag is not filled or sealed and may be rejected for use again. In varying embodiments of the invention, detection devices 126, 142 may be separate detection devices or the same detection device.

Figure 12:
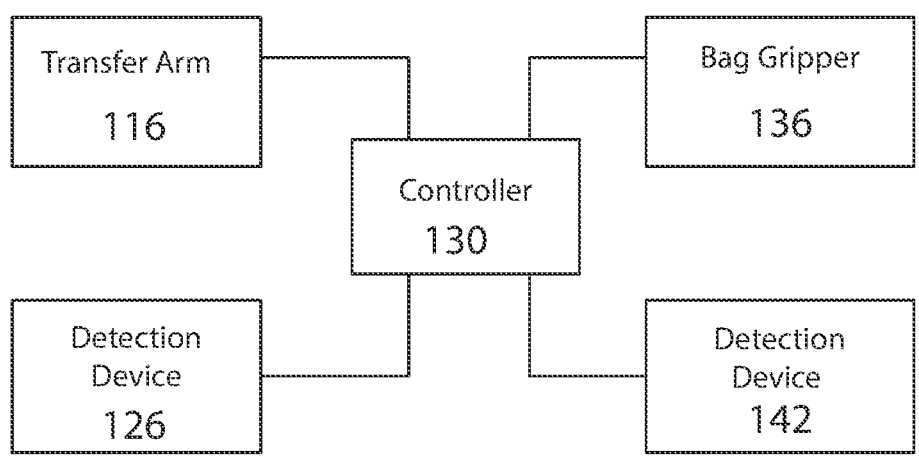

FIG. 12 illustrates a schematic of the controller 130 in communication with the detection devices 126, 142. As shown, the controller 130 is communication with the detection devices 126, 142, transfer arm 116, and bag gripper 136. As such, the controller 130 is able to controller operation of these elements based on the location of the bag as detected by the detection devices, as described above.

Figure 7:
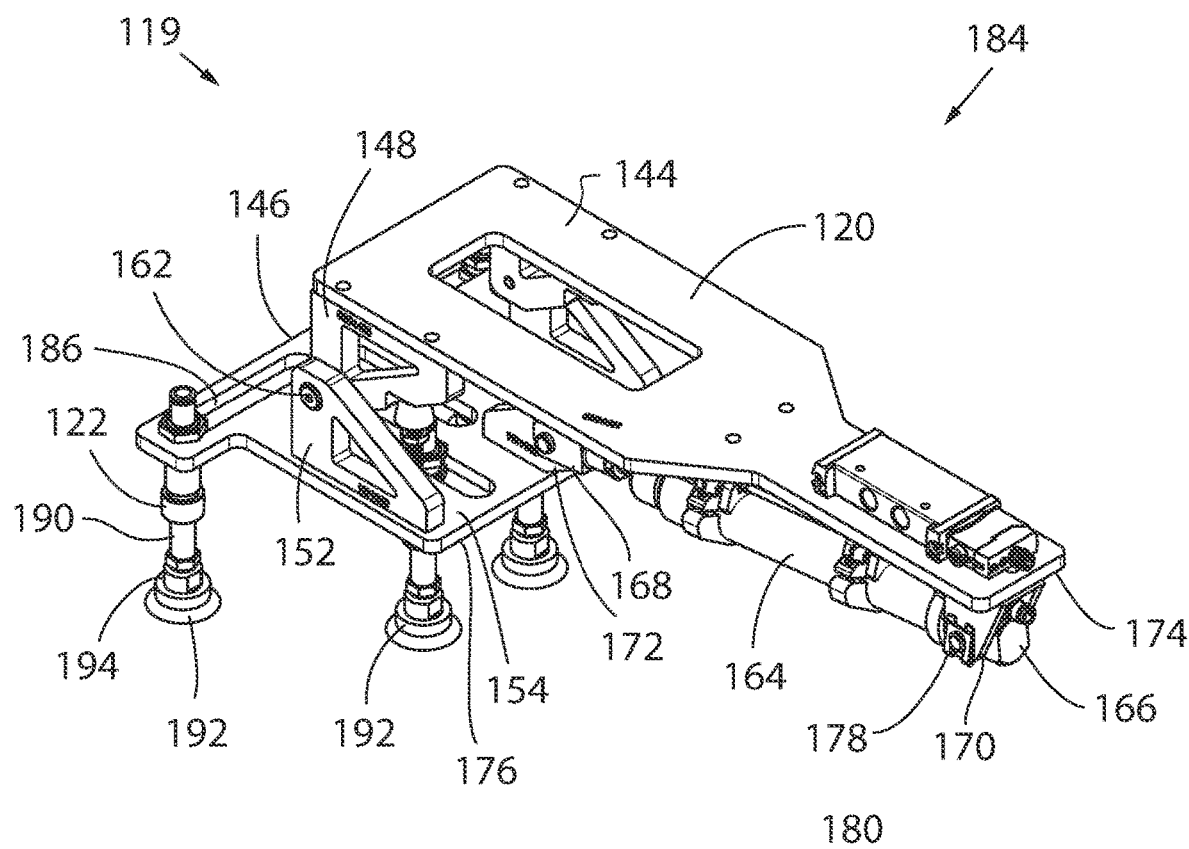
FIG. 7 is a perspective view of a conveyor transfer arm of the automated bag loading system of FIG. 4 in a first position.
Figure 8:
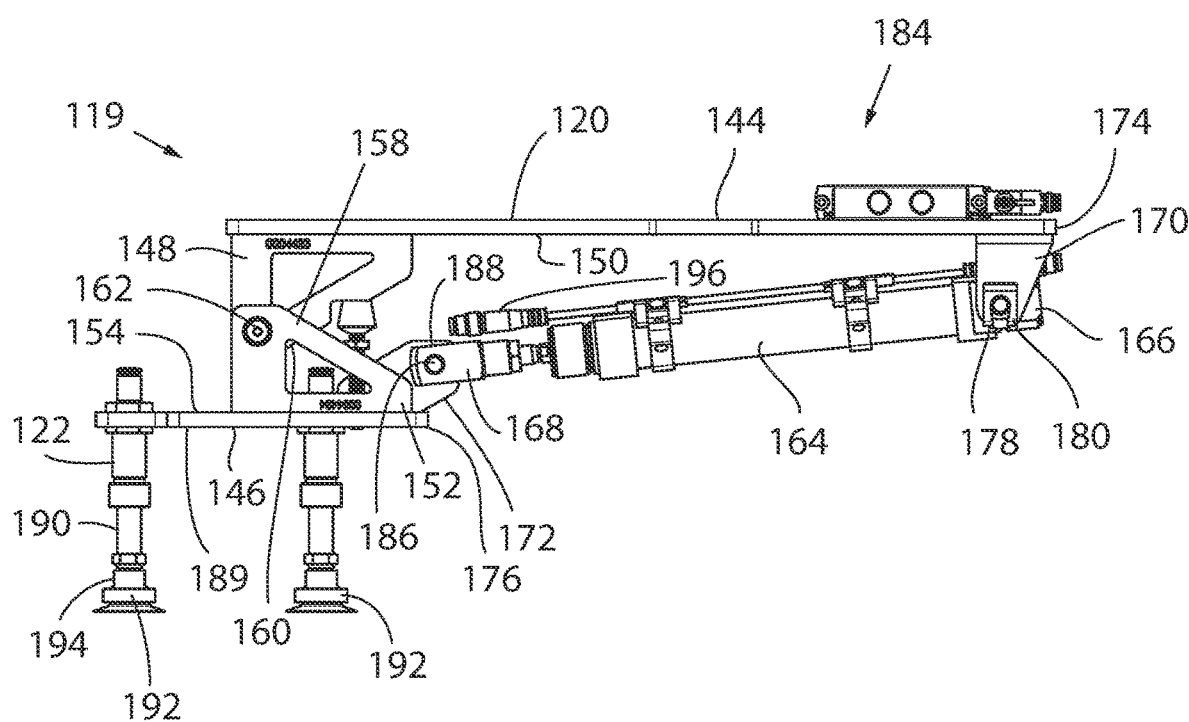
FIG. 8 is a side view of the conveyor transfer arm of FIG. 7 in the first position.
Figure 9:
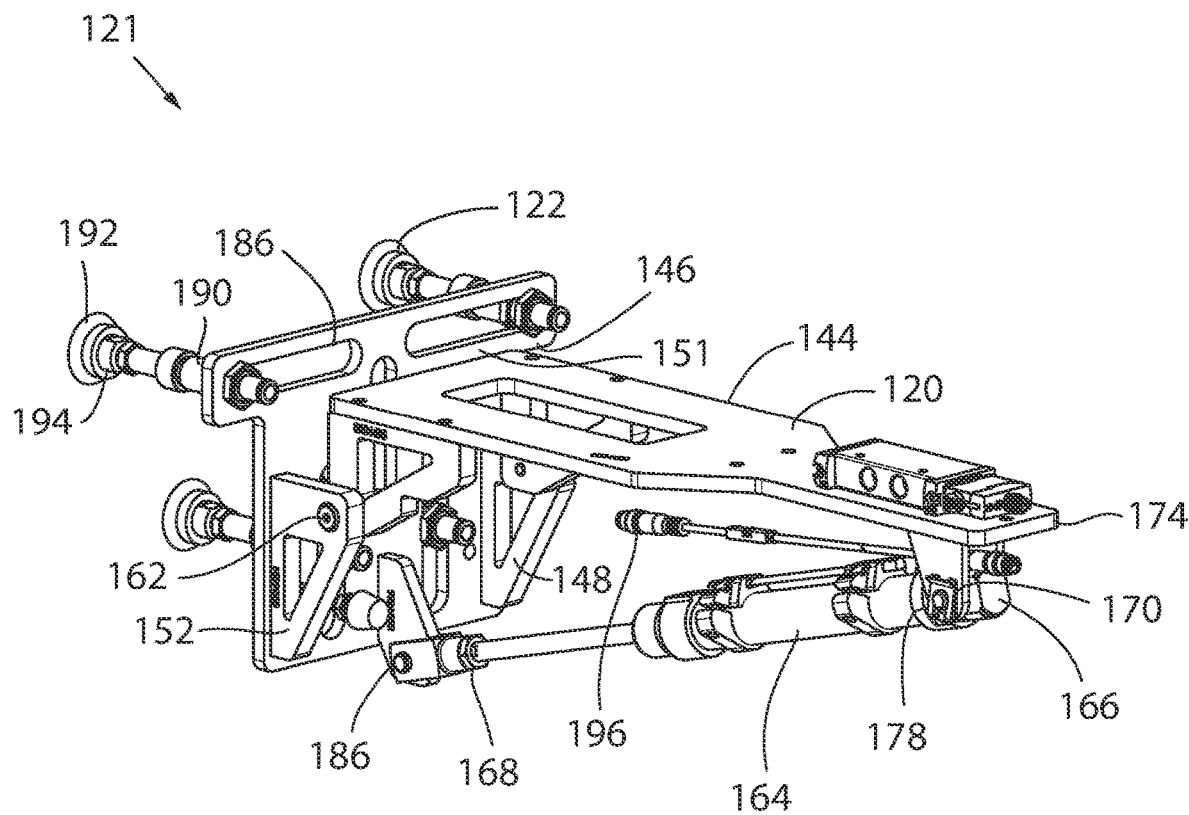
FIG. 9 is a perspective view of the conveyor transfer arm of FIG. 7 in a second position.
Figure 10:
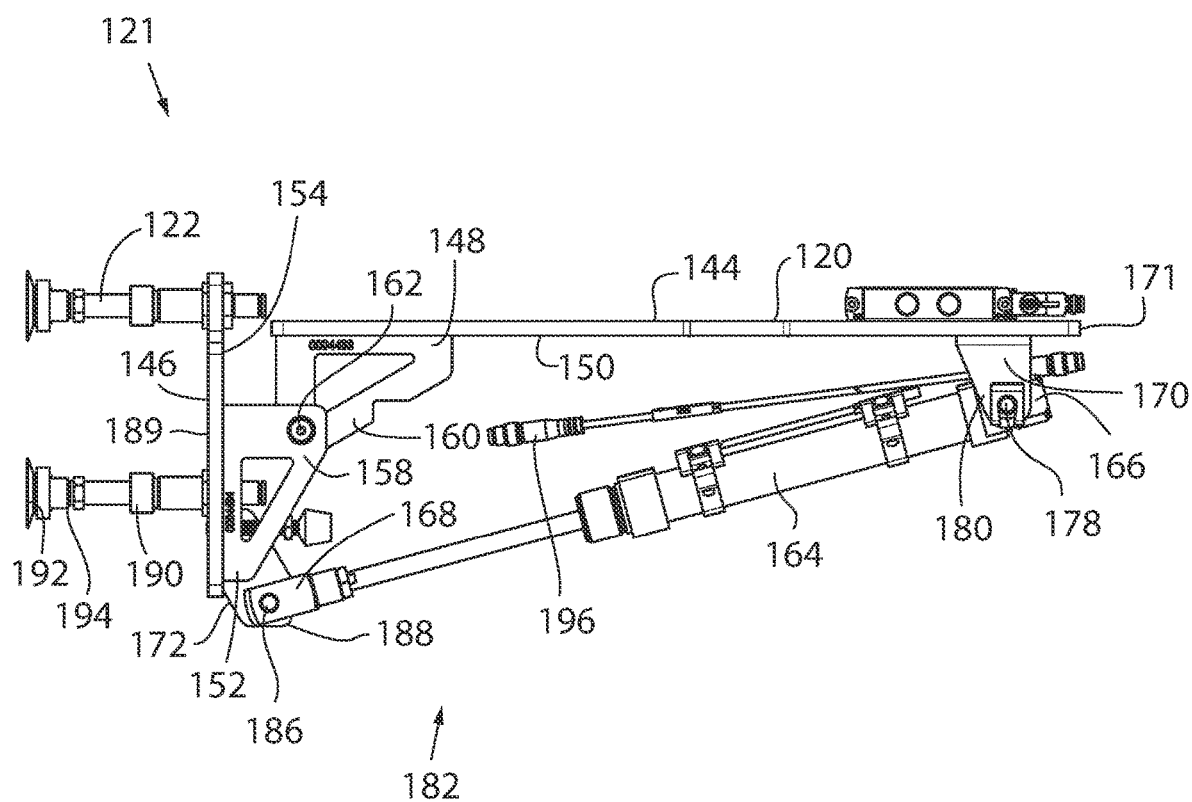
FIG. 10 is a side view of the conveyor transfer arm of FIG. 9 in the second position.

In the representative embodiment of the invention, the picking head 120 includes a first upper plate 144 and a second lower plate 146. FIGS. 7 and 8 depict the picking head 120 in a first position 119, in which the upper and lower plates 144, 146 are oriented parallel or generally parallel to each other. Meanwhile FIGS. 9 and 10 depict the picking head in a second position 121, in which the upper and lower plates 144, 146 are oriented at an angle with respect to each other. Preferably, the upper and lower plates 144, 146 are oriented perpendicular or generally perpendicular to each other in the second position 121. The lower plate 146 of the picking head 120 is configured to pivot between the first position 119 and the second position 121 either before, during, or after the transfer arm 116 transitions from the first point at the conveyor 112 to the second point at the rotary bag gripper 136.

The upper plate 144 includes at least one pivot plate 148 extending downward from a lower surface 150 of the upper plate 144. Similarly, the lower plate 146 includes at least one pivot plate 152 extending upward from the upper surface 154 of the lower plate 146. While the representative embodiment of the invention illustrates the use of two pivot plates 148 extending from the upper plate 144 and two pivot plates 152 extending from the lower plate 146, varying embodiments of the invention may include any number of pivot plates 148, 152, respectively. Each pivot plate 148 of the upper plate 144 and each pivot plate 152 of the lower plate 146 include respective openings disposed at respective distal ends 158, 160, thereof. In turn, a pivot hinge 162, preferably in the form of a bolt, is able to extend through the openings in the pivot hinges 148, 152 and pivotably couple together the upper and lower plates 144, 146 so that they pivot with respect to each other about the pivot axis 162.

While FIGS. 7-10 depict the hinge plates 148, 152 as having a generally triangular shape with a wider base adjacent the upper and lower plates 144, 146, alternative embodiments of the invention may include any shaped pivot hinge plate.

The picking head 120 of the transfer arm 116 also includes an actuation device 164 coupled to the upper plate 144 and the lower plate 146. As shown in the figures, a first end 166 of the actuation device 164 is coupled to the upper plate 144, while a second end 168 of the actuation device 164 is coupled to the lower plate 146. Preferably, the upper plate 144 includes one or more mounting plate 170 extending downward from its lower surface 150. The lower plate 146 also includes one or more mounting plate 172 extending upward from its upper surface 154.

While the mounting plate 170 of the upper plate 144 is shown extending from a first end 174 of the upper plate 144, varying embodiments of the invention may include the mounting plate 170 disposed at any location between the first end 174 of the upper plate 144 and the pivot hinge 148. Similarly, while the mounting plate 172 of the lower plate 146 is shown extending from a first end 176 of the lower plate 146, other embodiments of the invention may include the mounting plate 172 disposed at any location between the first end 176 of the lower plate 146 and the pivot hinge 152.

Referring again to the mounting plates 170 of the upper plate 144, an opening is formed at distal ends 180 of the mounting plates 170. The first end 166 of the actuation device 164 is secured to the distal ends 180 of the mounting plate 170 by way of at least pivot hinge 178 extending through the openings therein. Preferably, the first end 166 of the actuation device 164 is pivotably secured to the mounting plates 170 of the upper plate 144 so that the actuation device 164 may pivot with respect to the upper plate 144 as it transitions between an extended position 182 and a contracted position 184. The mounting plates 172 of the lower plate 146 also each include an opening formed in the distal ends 188 of the mounting plates 172. The second end 168 of the actuation device 164 is secured to the distal ends 188 of the mounting plates 172 of the lower plate 146 by a pivot hinge 186. Preferably, the second end 168 of the actuation device 164 is pivotably secured to the mounting plates 172 of the lower plate 146. In turn, the lower plate 146 is able to pivot with respect to the upper plate 144 and about the pivot axis 162 as the actuation device 164 transitions between the extended position 182 and the contracted position 184.

Figure 5:
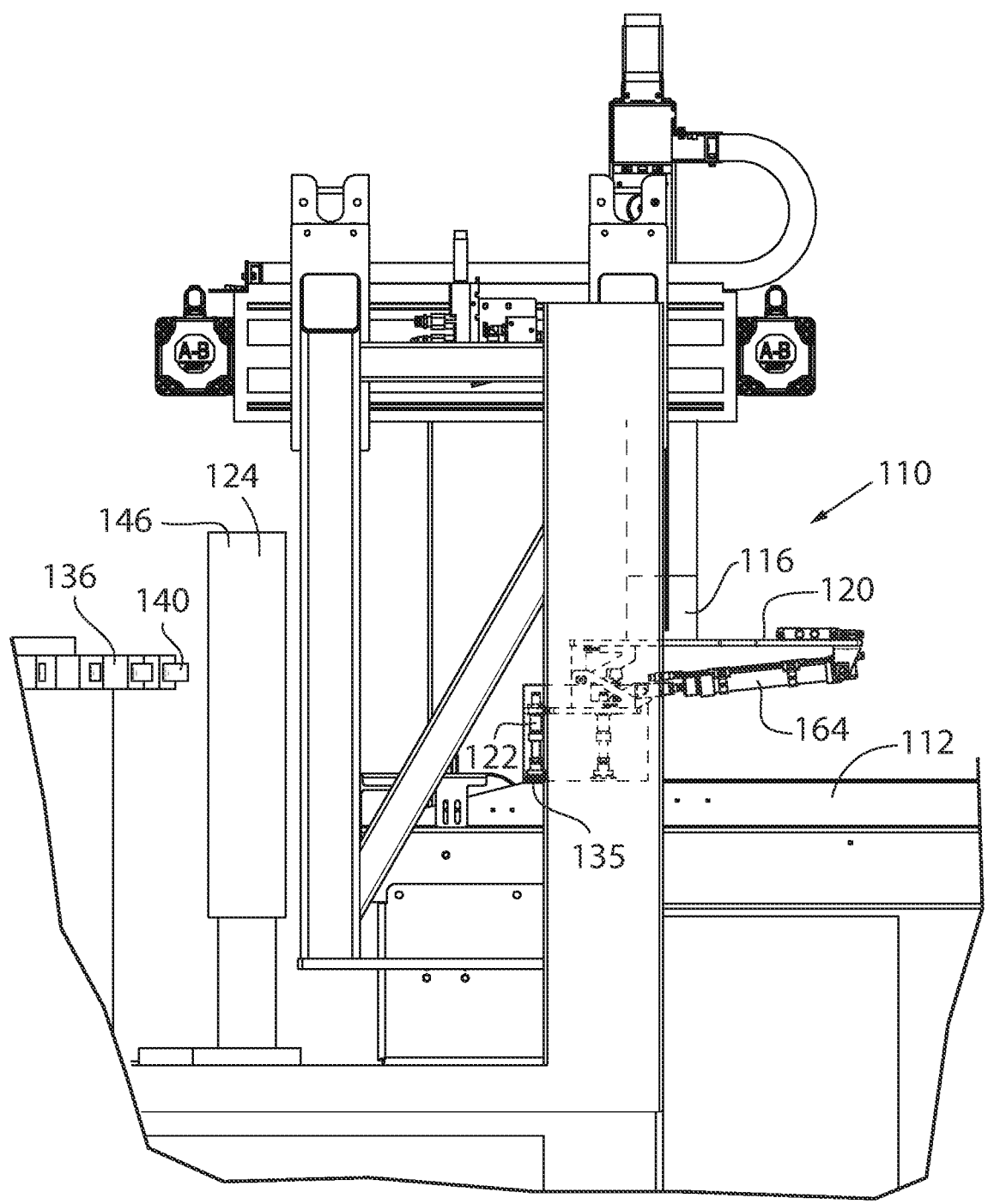
FIG. 5 is an elevation view of the automated bag loading system of FIG. 4 with the transfer arm in a first position.
Figure 6:
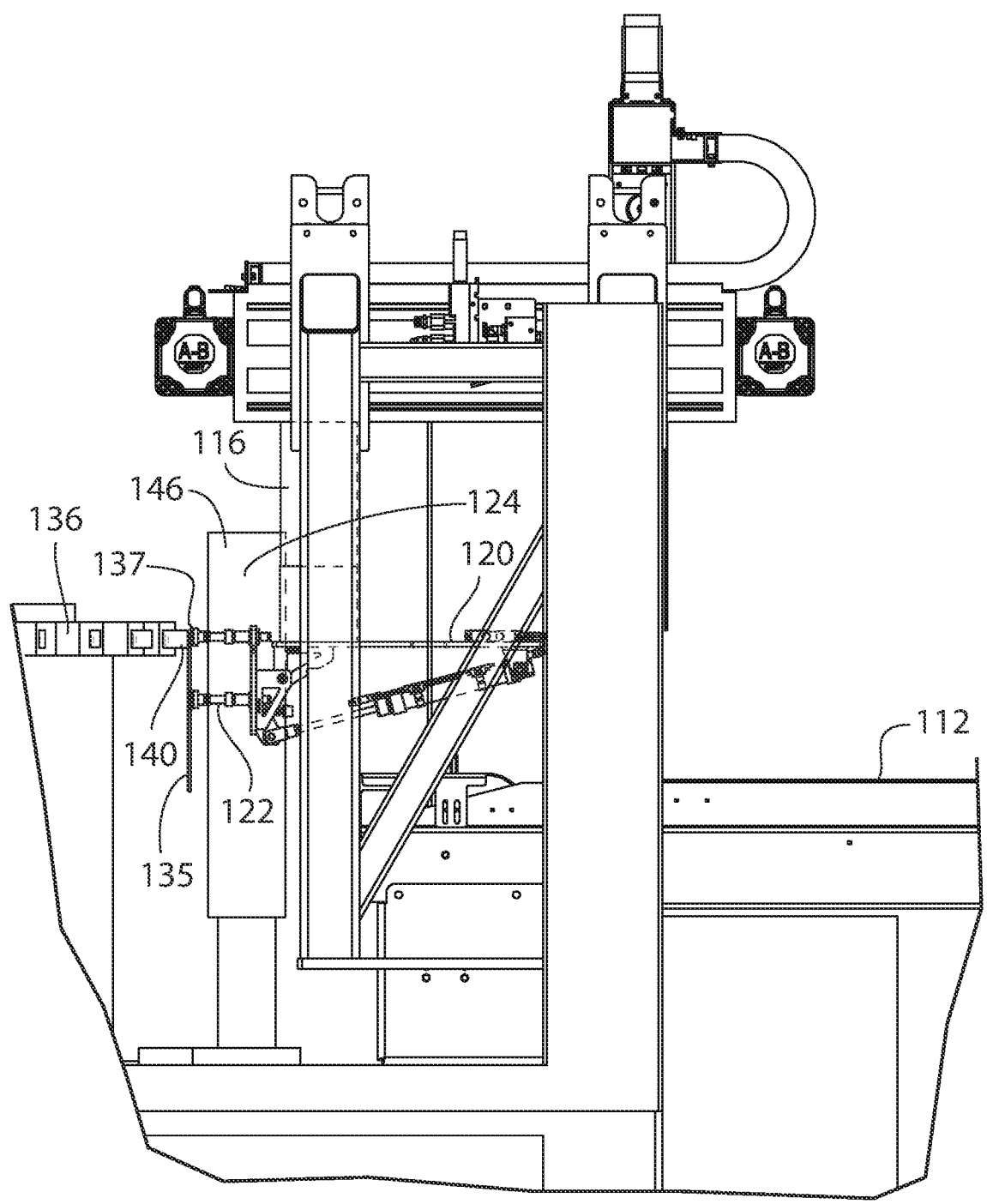
FIG. 6 is an elevation view of the automated bag loading system of FIG. 4 with the transfer arm in a second position.

FIGS. 5 and 6 depict the picking head 120 with the actuation device 164 in the contracted position 184. In the representative embodiment of the invention, the lower plate 146 and the upper plate 144 are oriented parallel to each other when the actuation device 164 is in the contracted position 184. FIGS. 7 and 8 depict the picking head 120 with the actuation device 164 in the extended position 182. As shown, the lower plate 146 and the upper plate 144 are oriented perpendicular to each other when the actuation device 164 is in the extended position 182.

Referring again to the lower plate 146 of the picking head 120, the lower plate 146 includes a number of slots 186 formed through the lower plate 146. The previously mentioned grabbing elements 122 extend through respective slots 186 so as to extend downward from a lower surface 189 of the lower plate 146. Each grabbing element 122 includes a support rod 190 with a flexible vacuum cup 192 disposed at a distal end 194 of the support rod 190. The support rod 190 extends through a respective slot 186 and is secured to the lower plate 146. As each vacuum cup 122 extends through a respective slot 186, the location of each vacuum cup 122 can be moved laterally along the length of its respective slot 186 so as to adjust the location of each vacuum cup 122. The grabbing elements 122 are connected to an air system 125 that is configured to create a vacuum within each vacuum cup 122 in order to grab a bag from the conveyor 112 and hold onto the bag as the picking head 120 of the transfer arm 116 moves from the conveyor 112 to the bag gripper 136. In addition, the pivoting of the lower plate 146 with respect to the upper plate 144 adjusts the orientation of the bag as it is moved from the first point at conveyor 112 to the second point at the bag gripper 136.

FIGS. 8 and 10 further illustrate the picking head 120 having a proximity sensor 196 disposed adjacent the actuation device 164. In the representative embodiment of the invention, the proximity sensor 196 is disposed at the same angle as the actuation device 164 when in the contracted position 184. As the actuation device 164 transitions to the extended position 182 and pivots about a pivot axes 178, 186, the second end 168 of the actuation device 164 is displaced from the proximity sensor 196. In turn, the proximity sensor 164 is able to detect the status of the actuation device 164 and orientation of the lower plate 146 with respect to the upper plate 144 based on the proximity of the actuation device 164 to the proximity sensor 196.

Once the picking head 120 arrives at the second point and transfers the bag to the bag gripper 36, the picking head 120 and transfer arm 116 return to the first point at the conveyor 112. If the conveyor 12 still contains bags, the picking head 120 grabs the next bag and transfers it from the first point at the conveyor 112 to the second point at the bag gripper 36. If the conveyor 112 is empty and contains no bags, the picking head 120 and transfer arm 116 remain in a holding position at or adjacent the first point until bags are indexed on the conveyor 112.

It should be understood that the above description, while indicating representative embodiments of the present invention, is given by way of illustration and not of limitation. Many changes and modifications may be made within the scope of the present invention without departing from the spirit thereof, and the invention includes all such modifications. Various additions, modifications, and rearrangements are contemplated as being within the scope of the following claims, including those shown in Appendix A, which particularly point out and distinctly claim the subject matter regarding as the invention, and it is intended that the following claims cover all such additions, modifications, and rearrangements.

What is claimed is:

1. A bag loading system comprising:
a transfer arrangement configured to grab a bag and transfer the bag from a first point to a second point;
a bag gripper configured to receive the bag from the transfer arrangement at the second point and rotate the bag to a filling station;
a detection device configured to detect a location of the bag between the first point and second point; and
a controller configured to:
receive the location of a leading edge of the bag between the first point and the second point; and
determine how much further the transfer arrangement and the bag need to travel to reach the second point.

2. The bag loading system of claim 1 wherein the location of the bag is detected at one or more positions between the first point and the second point.

3. The bag loading system of claim 2 wherein the detection device detects the leading edge of the bag to detect the location of the bag between the first point and the second point.

4. The bag loading system of claim 1 wherein the transfer arrangement grabs the bag from a conveyor at the first point.

5. The bag loading system of claim 1 further comprising a bag gripper detection device configured to detect the bag in a set of grippers of the rotary bag gripper.

6. The bag loading system of claim 5 wherein the bag gripper detection device measures a leading point of a top edge of the bag and a trailing point of the top edge of the bag;
wherein the bag gripper detection device transmits the measurement of the leading point and trailing point of the top edge of the bag to a controller; and
wherein the controller determines if the bag is properly placed within the set of grippers of the rotary bag gripper.

7. The bag loading system of claim 1 wherein the transfer arrangement includes a transfer arm having a picking head disposed at a distal end thereof, the picking head pivotable to transition the bag from a horizontal position to a vertical position.

8. A bag loading system comprising:
a transfer arm configured to grab a bag and transfer the bag from a conveyor to a bag gripper, the transfer arm including:
a picking head pivotably between a first position and a second position;
an upper plate pivotably coupled to a lower plate about a pivot axis; and
an actuation device having a first end coupled to the upper plate and a second end coupled to the lower plate, the actuation device configured to transition between a contracted position and an extended position to pivot the upper and lower plates about the pivot axis;
wherein the bag gripper configured to receive the bag from the transfer arm and rotate the bag to a filling station.

9. The bag loading system of claim 8 further comprising a detection device configured to detect a location of the bag as the transfer arm travels between the conveyor and the bag gripper.

10. The bag loading system of claim 8 wherein the bag is oriented horizontally when the picking head is oriented in the first position and vertically when the picking head is oriented in the second position.

11. The bag loading system of claim 8 wherein
the lower plate is oriented parallel to the upper plate when the picking head is in the first position and perpendicular to the upper plate when the picking head is in the second position; and
wherein the actuation device is oriented in the contracted position when the picking head is in the first position and the extended position when the picking head is in the second position.

12. The bag loading system of claim 11 wherein the upper plate includes at least one pivot plate extending from a lower surface thereof, each pivot plate includes an opening formed in a distal end thereof;

wherein the lower plate includes at least one pivot plate extending from an upper surface thereof, each pivot plate includes an opening formed in a distal end thereof;

a rod extending through the openings of the pivot plates of the upper and lower plates, the rod forming a pivot axis upon which the lower plate pivots with respect to the upper plate.

13. The bag loading system of claim 11 wherein the transfer arm further includes at least one grabbing element extending downward from the lower plate, each grabbing element including a rod and a cup disposed at a distal end thereof, the cup configured to grab the bag.

14. The bag loading system of claim 13 wherein the lower plate includes at least one slot formed therethrough;

wherein the rod of each grabbing element extends through a respective slot, the cup disposed at a distal end of the rod;

wherein each rod may be moved laterally along the length its respective slot to adjust the location of the grabbing element.

15. A bag loading system comprising:

a transfer arm including a picking head configured to grab a bag and transfer the bag from a conveyor to a bag gripper, the picking head configured to pivot the bag between a horizontal orientation and a vertical orientation;

the bag gripper configured to receive the bag from the picking head of the transfer arm and rotate the bag to a filling station;

a detection device configured to detect a location of the bag between the conveyor and the bag gripper;

a bag gripper detection device configured to detect the bag in a set of grippers of the bag gripper;

wherein the bag gripper detection device measures a leading point of a to edge of the bag and a trailing point of the top edge of the bag;

wherein the bag gripper detection device transmits the measurement of the leading point and trailing point of the top edge of the bag to a controller; and wherein the controller determines if the bag is properly placed within the set of grippers of the bag gripper.

16. The bag loading system of claim 15 wherein the picking head grabs the bag from the conveyor in the horizontal orientation; and wherein bag gripper receives the bag from the picking head in the vertical orientation.

17. The bag loading system of claim 15 wherein the controller is further configured to:

receive the location of the leading point of the bag being carried by the picking head between the conveyor and the bag gripper; and determine how much further the bag being carried by the picking head needs to travel to reach the bag griper.

18. The bag loading system of claim 15 wherein the detection device detects the location of the bag at one or more positions between the conveyor and the bag gripper.

19. The bag loading system of claim 15 wherein the picking head includes a first plate pivotably coupled to a second plate about a pivot axis and an actuator configured to extend and contract to pivot the first and second plates about the pivot axis.

* * * * *